United States Patent
Fujino

(10) Patent No.: US 6,292,509 B1
(45) Date of Patent: Sep. 18, 2001

(54) DATA-COMMUNICATION APPARATUS AND METHOD FOR MODULATION OR DEMODULATION IN SPECIFIED MODE

(75) Inventor: Toru Fujino, Urawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/929,773

(22) Filed: Sep. 15, 1997

(30) Foreign Application Priority Data

Sep. 25, 1996 (JP) .................................. 8-252949

(51) Int. Cl.$^7$ .................................................. H04L 5/16
(52) U.S. Cl. .................. 375/222; 370/296; 379/100.17; 358/434; 358/435
(58) Field of Search .................. 375/222; 379/93.31, 379/93.34, 100.15, 100.17, 93.01, 93.09, 93.11, 93.26, 93.29; 358/438, 435, 434; 370/296

(56) References Cited

U.S. PATENT DOCUMENTS

| | | | |
|---|---|---|---|
| 4,215,243 | * 7/1980 | Maxwell | 364/237.8 |
| 4,908,851 | * 3/1990 | Kotani et al. | 379/100.15 |
| 5,025,469 | * 6/1991 | Bingham | 379/100.17 |
| 5,153,897 | * 10/1992 | Sumiyoshi et al. | 375/222 |
| 5,153,912 | * 10/1992 | Sakakibara et al. | 379/100.15 |
| 5,185,783 | * 2/1993 | Takahashi et al. | 379/93.09 |
| 5,293,575 | * 3/1994 | Hirai | 379/100.16 |
| 5,450,472 | * 9/1995 | Brax | 455/557 |
| 5,721,731 | * 2/1998 | Yoshida | 370/296 |
| 5,809,085 | * 9/1998 | Goodson et al. | 375/320 |
| 5,812,281 | * 9/1998 | Mukai et al. | 358/435 |
| 5,847,842 | * 12/1998 | Maeda | 358/434 |
| 5,966,430 | * 10/1999 | Yoshida | 379/100.15 |

* cited by examiner

*Primary Examiner*—Stephen Chin
*Assistant Examiner*—Shuwang Liu
(74) *Attorney, Agent, or Firm*—Fitzpatrick, Cella, Harper & Scinto

(57) ABSTRACT

A data-communication apparatus for performing data communication by using a modem with a plurality of modulation/demodulation modes, operated in a mode specified from among the plurality of modulation/demodulation modes, is capable of distinguishing signals in a plurality of modulation/demodulation modes which may be simultaneously received by the data-communication apparatus. Specifically, a frequency-detection function provided in a modem is used to detect the frequency of the V.8 protocol signal CI while the modem is receiving the signal in the V.21 mode in the T.30 protocol. When the frequency is detected, a CPU causes the mode of the modem to switch to the V.8 mode for signal reception.

14 Claims, 4 Drawing Sheets

FIG. 4

| start | b0 | b1 | b2 | b3 | b4 | b5 | b6 | b7 | stop | | 1 SEQUENCE 30bits (=100ms) |
|---|---|---|---|---|---|---|---|---|---|---|---|
| 1 | 1 | 1 | 1 | 1 | 1 | 1 | 1 | 1 | 1 | TEN "1"s BEFORE INFORMATION SEQUENCE | |
| 0 | 0 | 0 | 1 | 1 | 0 | 0 | 0 | 0 | 1 | CI-SEQUENCE SYNCHRONOUS CODE | |
| 0 | 1 | 0 | 0 | 0 | x | x | x | x | 1 | CALL-ACTIVATION FUNCTION | |

980 Hz (BINARY REPRESENTATION) 13×3 SEQUENCES = 39bits
1180 Hz (BINARY REPRESENTATION) 14×3 SEQUENCES = 42bits
UNDEFINED : 3bit

DATA-COMMUNICATION APPARATUS AND METHOD FOR MODULATION OR DEMODULATION IN SPECIFIED MODE

BACKGROUND OF THE INVENTION

1. Field of the Invention

The present invention relates to data-communication apparatuses and methods, and in particular, to a data-communication apparatus and method for performing data communication by using a modem with a plurality of modulation/demodulation modes which is controlled by the data-communication apparatus to modulate/demodulate signals in a mode specified from among the modulation/demodulation modes.

2. Description of the Related Art

Conventional data-communication apparatuses of this type include, for example, a facsimile apparatus. Concerning the facsimile apparatus, increasing its transmission speed is in progress. The International Telecommunications Union (ITU) has recommended a communication protocol (V.34) using a V.34-modem with a maximum transmission speed of 33.6 kilobits/second (kbps) which exceeds the 14.4 kbps obtained by a conventional V.17-modem, and the V.8 protocol for specifying a modem to be used when line connection to another unit is established. The V.34 protocol and the V.8 protocol will be hereinafter treated as new protocols. Although increasing the transmission speed is effective in reducing communication costs, it is required that a facsimile apparatus as a communication apparatus have a protocol capable of achieving a faster transmission speed, and maintain compatibility with conventional facsimile apparatuses.

When performing automatic reception, a conventional facsimile apparatus having both the new and conventional protocols sends a signal ANSam (representing the V.8 protocol and being a 2100-Hz modified tone) compatible with the conventional protocol signal CED. When the other apparatus receives the signal ANSam, it sends a new protocol signal CM (which is a call-activation menu signal, which is used to represent a usable modulation method, and which is a 300-bps signal modified in the V.21 low-range channel). When the facsimile apparatus receives the signal CM within a reference time, it sends a signal JM (which is a common menu signal and is a 300-bps signal modulated in the V.21 high-range channel) representing a usable modulation method for both apparatuses, based on the signal CM and its own function. On receiving the signal JM, the other apparatus sends a signal CJ (which represents a termination of the signal CM and is a 300-bps signal modulated in the V.21 low-range channel). In this manner the facsimile apparatus communicates with a modem using the modulation method represented by the signal JM. Half-duplex communication with the V.34-modem, designated by the signal JM, shifts the protocol for the facsimile apparatus to the V.34 protocol. In addition, when the facsimile apparatus sends the signal ANSam, and cannot receive the signal CM within the predetermined time, it determines that the other apparatus is a conventional one, and transmits a conventional signal DIS in the T.30 protocol which is modulated in the V.21 high-range channel. The facsimile apparatus receives a signal DCS modulated in the V.21 high-range channel.

When the other apparatus performs manual transmission, and starts a transmission operation after the signal ANSam ends, it does not send the signal CM and the signal CJ. Accordingly, the facsimile apparatus sends the conventional T.30 protocol signal DIS. In this case the signal DIS is sent, with the signal DIS being provided with information representing possession of the V.8 protocol-functions so that the T.30 protocol can shift to the new protocol. The signal DIS causes the other apparatus to recognize that the receiver apparatus has the V.8 protocol. If the other apparatus has recognized that the receiver apparatus has new protocol functions, it sends a signal CI (being a call-activation display signal and a 300-bps signal modulated in the V.21 low-range channel) representing a return to the V.8 protocol. If the other apparatus has recognized the receiver apparatus has no new-protocol functions, it sends a signal DCS (300-bps signal modulated in the V.21 high-range channel) in the T.30 protocol.

In order to cope with the above circumstances, the receiver apparatus must have a structure capable of simultaneously detecting the signal CI modulated in the V.21 low-range channel (L) and the signal DCS modulated in the V.21 high-range channel (H).

Conventionally, the two channels: the V.21 low-range channel (L) and the V.21 high-range channel (H) are used for full-duplex communication. Conventional facsimile apparatuses use the V.21 modem for only half-duplex communication, and have no structure capable of simultaneously receiving signals in the two channels. In other words, setting the V.21-modem in the high-channel mode (H-channel mode) for receiving the signal DCS hinders the V.21-modem from receiving the signal CI in the low-range channel. Also, setting the V.21-modem in the low-range channel mode (L-channel mode) for receiving the signal CI hinders the V.21-modem from receiving the signal DCS in the high-range channel.

To overcome this problem, by using a plurality of V.21-modems, it is possible that one end receives a signal in the low-range channel and another end receives a signal in the high-range channel. However, such a structure is complicated.

SUMMARY OF THE INVENTION

Accordingly, an object of the present invention is to improve a conventional data-communication apparatus in view of the foregoing problems.

Another object of the present invention is to distinguish signals in a plurality of modulation modes which may be simultaneously received, without using a complicated structure.

A further object of the present invention is that, even if a modem incapable of simultaneously distinguishing signals in a plurality of modulation modes is used, signals in a plurality of modulation modes which may be simultaneously received can be received.

To this end, according to an aspect of the present invention, the foregoing objects have been achieved through provision of a data-communication apparatus for performing data communication by using a modem with a plurality of modulation/demodulation modes, operated in a mode specified from among the plurality of modulation/demodulation modes, the data-communication apparatus comprising: frequency-detection means for detecting the frequency of a received signal; and control means for specifying the operation mode of the modem, and changing the operation mode of the modem in accordance with the detection obtained by the frequency-detection means, wherein the frequency of a signal in the modulation/demodulation mode being not specified by the control means is detected by the frequency-detection means while the modem is operating in the specified mode, and the detection of the frequency causes a change of the operation mode of the modem so that the plurality of modulation/demodulation modes are capable of being distinguished.

According to another aspect of the present invention, the foregoing objects have been achieved through provision of a data-communication method using a modem with a plurality of modulation/demodulation modes, operated in a mode specified from among the plurality of modulation/demodulation modes, the data-communication method comprising the steps of: detecting the frequency of a received signal; specifying the operation mode of the modem, and changing the operation mode in accordance with the frequency detection; and detecting the frequency of a signal in the modulation/demodulation mode being not specified by the control means while the modem is operating in the specified operation mode, and changing the operation mode of the modem by the frequency detection so that the plurality of modulation/demodulation modes are capable of being distinguished.

BRIEF DESCRIPTION OF THE DRAWINGS

FIG. 4 is a table showing the format and characteristics of signal CI.

DESCRIPTION OF THE PREFERRED EMBODIMENT

An embodiment of the present invention will be described with reference to the attached drawings.

The embodiment will describe a facsimile apparatus by way of example.

Figure 1:
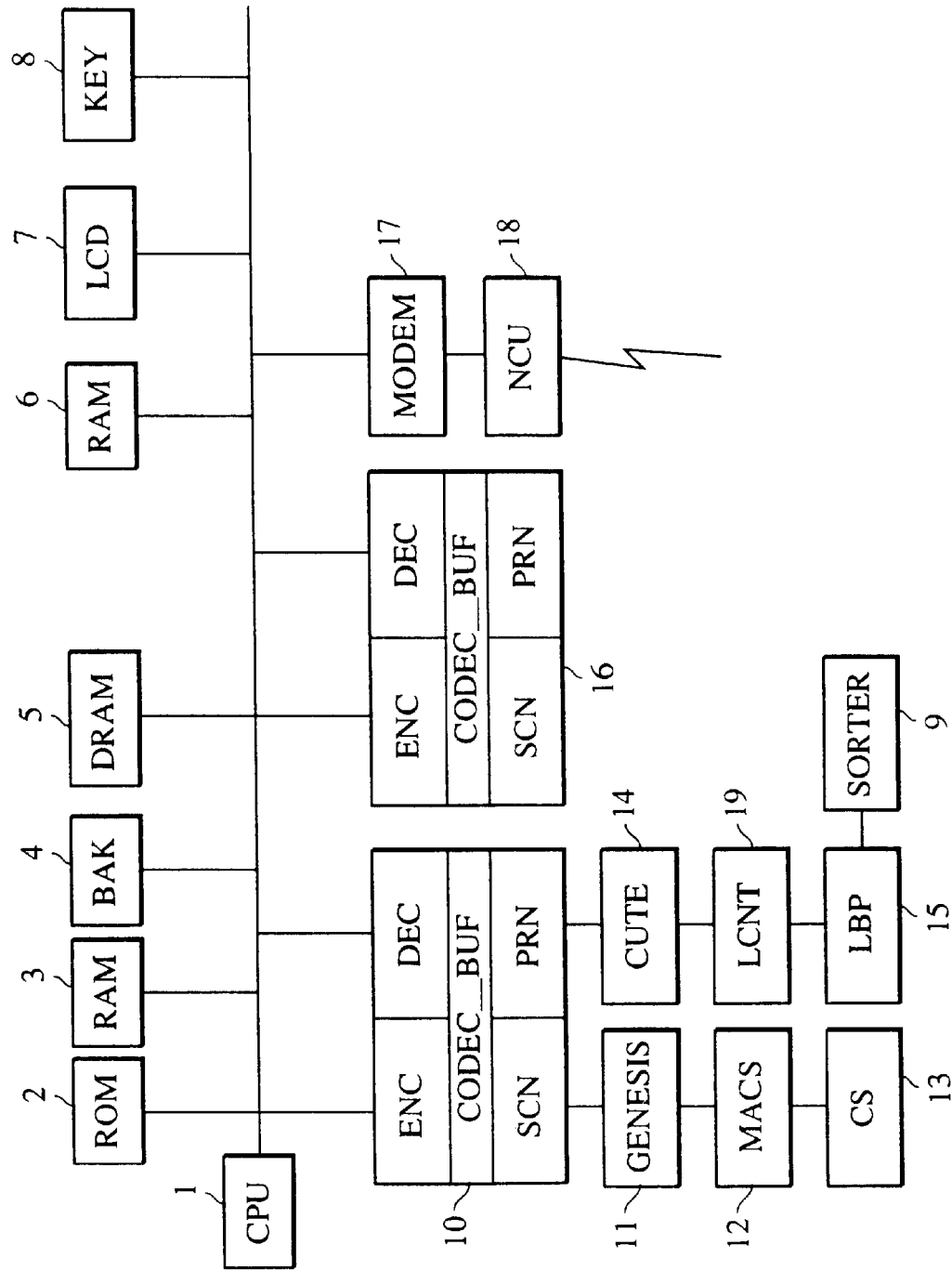
FIG. 1 is a block diagram showing a facsimile apparatus according to an embodiment of the present invention.

FIG. 1 shows a block diagram of the facsimile apparatus according to the embodiment.

A central processing unit (CPU) 1 including a microcomputer controls the whole of the facsimile apparatus by executing programs stored in a read only memory (ROM) 2. The programs are separated by their functions into operation units called "tasks". The order of executing the programs is controlled by a program called an "operating system (OS)" stored in the ROM 2, which enables the programs to operate superficially in parallel. The operations of the following units are executed by the respective tasks.

A random access memory (RAM) 3 is a work area for temporarily holding various types of data, parameters and so forth. A RAM 6 is a buffer memory for transmission and reception. A direct random access memory (DRAM) 5 is an image memory for holding image data, and is supported by a backup circuit (BAK) 4 such as a battery.

A liquid crystal display (LCD) 7 is used to show the operation modes of the facsimile apparatus, and various types of information.

An operation unit (KEY) 8 has various key-input switches for operating the facsimile apparatus.

A sorter 9 is used to sort and output sheets of image-recorded recording paper.

An encoding/decoding processor 10 is used to perform reading and recording.

A reader (CS) 13 includes contact image-sensors. A correction circuit (MACS) 12 processes an original image read by the reader (CS) 13, using shading correction or the like. An image processing circuit (GENESIS) 11 converts the corrected image to binary values and processes the corrected image so that serial image data is formed. The image processing circuit (GENESIS) 11 outputs the serial image data to the encoding/decoding processor 10. The serial image data from the image processing circuit (GENESIS) 11 is input to a reading input unit (SCN) included in the encoding/decoding processor 10. The inputted image is loaded into a coding buffer memory (CODEC-BUF) as an internal RAM. The loaded image data is compressed and encoded by an encoder (ENC), and is stored in the image memory (DRAM) 5. At the same time, management information such as a reception number, destination information, the number of pages, the number of lines in each page, the width of each read page, and image-stored memory-block information is stored in the RAM 3.

Image data on which correction and image conversion are performed by the recording image-processing circuit (CUTE) 14 are printed on sheets of recording paper by a laser-beam printer (LBP) 15 under control of a control circuit (LCNT) 19 for the laser-beam printer (LBP) 15. The sorter 9 classifies the sheets on which the images are recorded by image types and sizes, and discharges the classified sheets. The control circuit (LCNT) 19 includes sensors for detecting an abnormal condition in printing by the laser-beam printer (LBP) 15, an abnormal condition in discharging by the sorter 9, and the number of recording-paper sheets in feeding for printing. The control circuit (LCNT) 19 holds status information (such as paper jam, toner exhaustion and internal abnormality in the laser-beam printer (LBP) 15) so that the CPU 1 can read the status information.

An encoding/decoding processor 16 is used for communication.

A modem 17 for modulating or demodulating a signal has a modulation/demodulation function adapted for ITU-recommended modulation/demodulation protocols such as V.21, V.27ter, V.29, V.17 and V.34. The modem 17 includes a data-signal processor (DSP), and also has the function of detecting a signal frequency. The modem 17 and the CPU 1 are connected by a bus. Transmission of image data between the modem 17 and the CPU 1, transmission of data representing a detected frequency, and transmission of various control signals are totally performed by the bus.

A network-control unit (NCU) 18 has functions for controlling seizure or release of a telephone line, call (automatic dialing) to a telephone line, and so forth.

The foregoing descriptions have outlined the facsimile apparatus according to the embodiment.

The transmitting operation will be described below.

The image data stored in the DRAM 5 is decoded by a decoder (DEC) in the communication encoding/decoding processor 16, and is loaded as unprocessed image data into a buffer included in the RAM 6. If necessary, the loaded image data is compressed by the CPU 1, and is re-loaded into the buffer. Subsequently, the image data is encoded by the communication encoding/decoding processor 16, using an encoding method capable of being processed by another communication apparatus, and is transferred as transmission data to the transmission buffer of the RAM 6. The transmission data transferred into the transmission buffer is transferred in units of 1 byte by the modem 17, and is modulated by the modem 17. The modulated data is sent to a line via the NCU 18.

The reception operation will be described below.

After synchronization with a transmitter (another communication apparatus) is established using a protocol (described below) used when an incoming call is received, received data is input through the NCU 18 to the modem 17. The received data is demodulated by the modem 17, and is transferred in units of 1 byte to the reception buffer of the RAM 6. The received data transferred into the reception buffer is decoded by the decoder of the communication encoding/decoding processor 16. The received data is checked for an error (communication error), based on the decoded data. If no error has been detected, the received data is stored into the buffer in the communication encoding/decoding processor 16. The received data stored in the buffer is encoded by the encoder using an encoding method for data storage, and is stored in the DRAM 5, with its management information stored in the RAM 3.

An operator operates the various keys of the operation unit 8 to perform various types of designation and setting. The operator can previously determine permission to combine pages in a transmission mode, the number of the pages to be combined, and so forth. The determined contents are stored in the RAM 3, and can be viewed on the display (LCD) 7. The CPU 1 detects data inputted with the keys, and controls the display (LCD) 7 to show necessary data.

Figure 2:
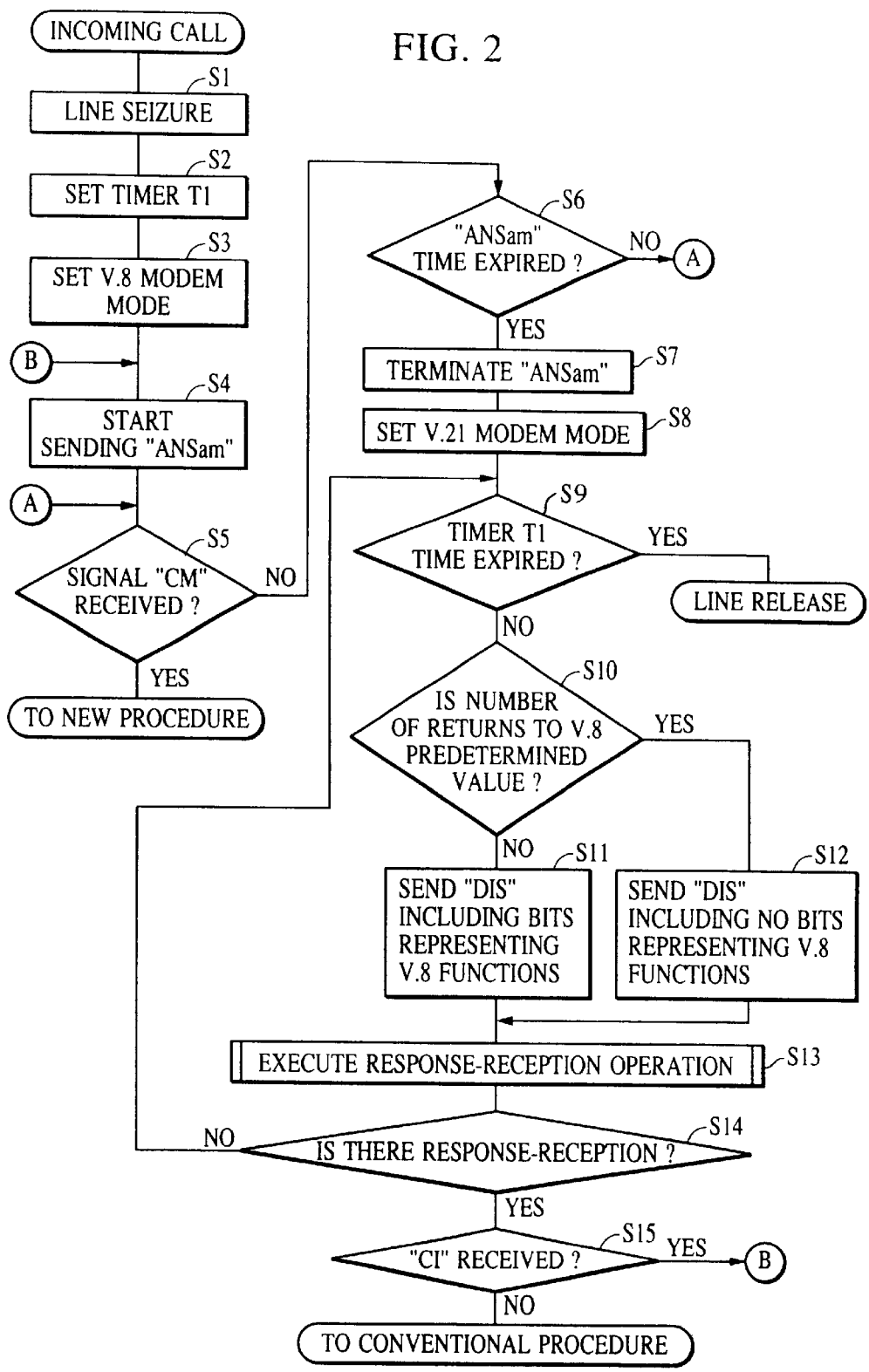
FIG. 2 is a flowchart showing a control process performed by a central processing unit (CPU) when an incoming call is received.

FIG. 2 shows a flowchart of the process for executing a control program for the modem 17, controlled by the CPU 1 in the embodiment when an incoming call is received. The control program is stored in the ROM 2.

When a ringing signal from the line is received with the communication apparatus set in an automatic reception mode, a detection signal is output from a ringing-signal detection circuit included in the NCU 18. When the detection signal is input to the CPU 1, the CPU 1 outputs a control signal to the NCU 18 so that the NCU 18 seizes the line (Step S1). A timer T1 is set (to, e.g., approximately 35 seconds) based on ITU Recommendations for the T.30 protocol (Step S2).

In order that the new protocol (the V.8 protocol) may be executed, the modem 17 is set in the V.8 mode (Step S3), so that the modem 17 starts sending the V.8 protocol signal ANSam (Step S4). Step S4 is followed by determination of whether or not the modem 17 has received the signal CM before a lapse of a constant period from the start of sending the signal ANSam (Steps S5, S6). If the modem 17 has received the signal CM within the constant period, the new protocol/protocols (the V.8 protocol or the V.8 and V.34 protocols) is/are executed. If the modem 17 has not received the signal CM within the constant period, the modem 17 is controlled to terminate sending the signal ANSam (Step S7), and the modem 17 is set in the V.21 mode (Step S8) for communication of the T.30 protocol signals. The timer T1 is checked for the expiration of the set time (Step S9). If the set time has expired, a control signal causing the NCU 18 to release the line is output to terminate the processing. If the set time in the timer T1 has not expired, determination of whether or not a counter value of the number of returns from the T.30 protocol to the V.8 protocol reaches a predetermined value is performed (Step S10). This counter is used to prevent a termination of image communication based on the T.30 protocol, due to endless returns from the T.30 protocol to V.8 protocol upon no reception of the signal CM. If the counter value has not reached the predetermined value, the modem 17 is controlled to send the signal DIS in which information (bits) representing possession of the V.8 protocol functions is set (Step S11). Also, if the counter value has reached the predetermined value, the modem 17 is controlled to send the signal DIS in which information (the mentioned bits switched off) representing no possession of the V.8 protocol functions is set (Step S12).

When the signal DIS is sent, a response-reception operation (described below) is executed (Step S13), and determination of whether or not there is response reception is successively performed (Step S14). If there is no response reception, the process returns to Step S9. If there is response reception, determination of whether or not the received protocol signal is the V.8 protocol signal CI is performed (Step S15). If the received protocol signal is the signal CI, the process returns to Step S4. If not, the conventional T.30 protocol is executed.

Figure 3:
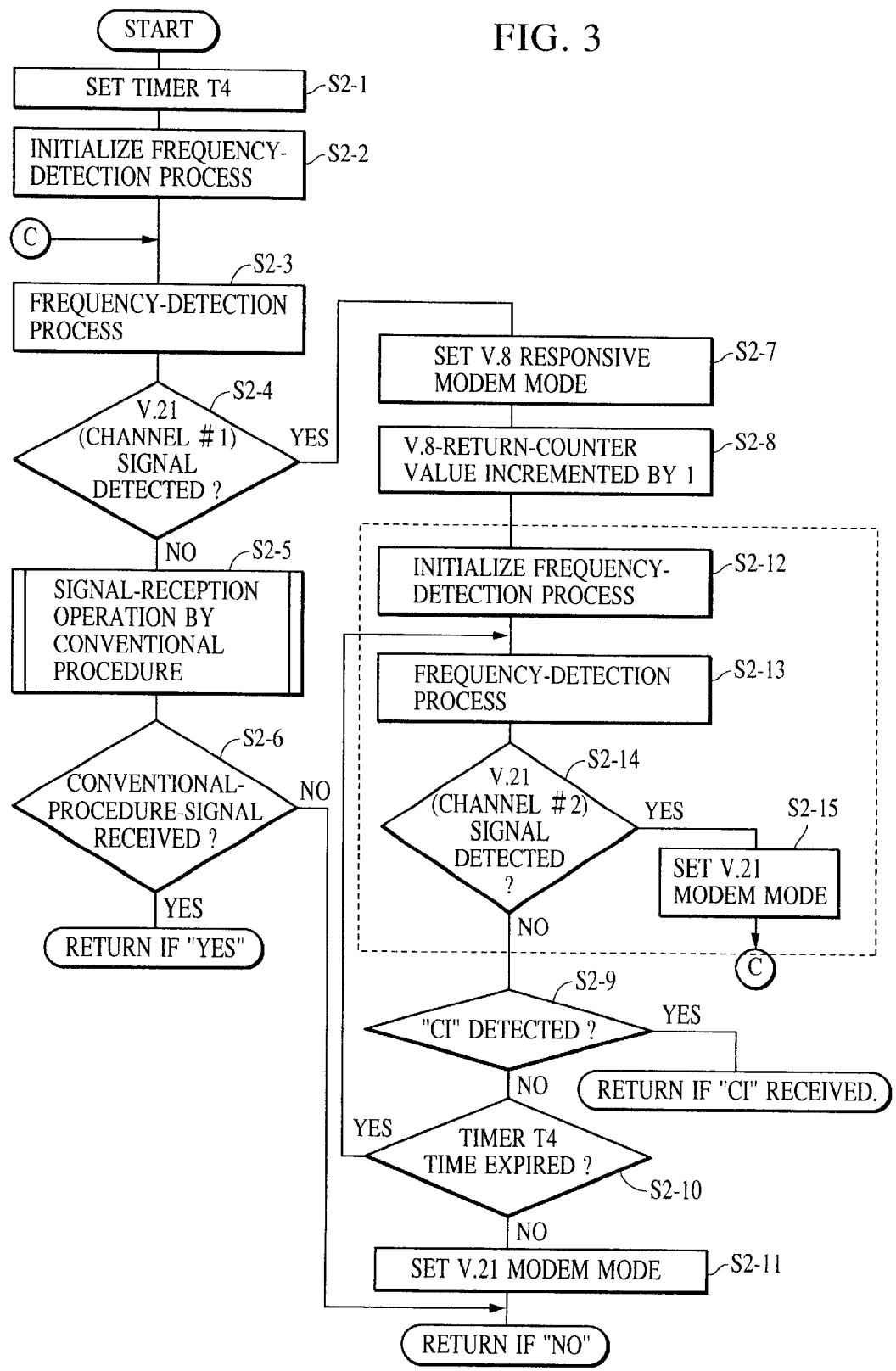
FIG. 3 is a flowchart showing the process for controlling a response-reception operation performed by the CPU.

FIG. 3 shows a flowchart of the process for executing a control program used in the response-reception operation (Step 13).

At first, a timer T4 for detecting whether or not there is the response reception is set (Step S2-1). A frequency-detection process performed by the modem 17 is initialized (Step S2-2). The modem 17 is controlled to detect a frequency included in the signal CI shown in FIG. 4 (Step S2-3). If the frequency detection has not detected a frequency having a possibility of representing the V.21 low-range channel signal CI, a signal-reception operation based on the conventional T.30 protocol is performed (Step S2-5). If the frequency detection has determined that the T.30 protocol signal (signal DCS) was received (Step S2-6), image communication based on the T.30 protocol is performed after Steps S14 and S15 shown in FIG. 2. In addition, if the frequency detection in Step S2-3 has detected the frequency having a possibility of representing the V.21 low-range channel signal CI, the modem 17 is set in the V.8 response mode (Step S2-7). The counter value described in Step S10 shown in FIG. 2 is incremented (Step S2-8). The frequency-detection process by the modem 17 is initialized (Step S2-12). The modem 17 is controlled to detect the frequency of the T.30 protocol signal (signal DCS) in the V.21 high-range channel (Step S2-13). While determination of whether or not a frequency having a possibility of representing the T.30 protocol signal in the V.21 high-range channel is being performed (Step S2-14), determination of whether or not the signal CI is received before expiration of the set time in the timer T4 expires is performed (Steps S2-9, S2-10).

If the frequency having a possibility of representing the T.30 protocol signal is detected in Step S2-14, the modem 17 is set in the V.21 mode (Step S2-15), and the process returns to Step S2-3.

If reception of the signal CI is detected in Step S2-9, and if the signal CI is not received before the process proceeds to Step S4 via Steps S14 and S15 and the set time in the timer T4 expires, the modem 17 is set in the V.21 mode (Step S2-11), and the process returns from Step S14 to Step S9 shown in FIG. 2. The modem 17, according to the embodiment, is designed to execute in parallel the frequency-detection process and signal-demodulation process in the mode set by the CPU 1.

Steps S2-12 to S2-15 shown in FIG. 3 are used to shorten the time for shifting to the T.30 protocol. Accordingly, these steps may be omitted.

FIG. 4 shows a chart of the format and characteristics of the signal CI.

The signal is transmitted at regular ON/OFF intervals. The signal daring the ON period is an example of a 300-bps bit string modulated in the V.21 low-range channel defined in the V.21 recommendation. The ON period has a minimum of 3 sequences (300 milliseconds) and a duration of 2.0 seconds or less. The OFF period has a duration which is not less than 0.4 seconds and not more than 2.0 seconds. The chart shows one sequence of the signal CI.

The signal CI is a 300-bps binary bit string, in which "1" is sent at a central frequency of 980 Hz and "0" is sent at a central frequency of 1180 Hz. The length of one sequence is 30 bits (=100 milliseconds). In Step S2-3 shown in FIG. 3, the modem 17 is controlled to detect these frequencies.

According to this embodiment, when a modem is set in the V.21 high-channel reception mode (the mentioned V.21 mode), and the V.21 low-channel signal cannot be received, a frequency-detection function provided in the modem is used to detect the central frequency of the V.21 low-range channel. If the frequency-detection process detects a frequency having a possibility of representing the V.8 signal CI in the V.21 low-range channel, the mode of the modem is switched to the V.8 response mode (V.21 low-channel reception mode) so that V.8 signal CI is received. Thereby, both the T.30 signal DCS and the V.8 signal CI can be received, and even if another apparatus performs manual transmissions the new protocol (the V.8 protocol) can be executed at a high speed.

In addition, the present invention is not limited to the above-described embodiment, but may be variously modified.

What is claimed is:

1. A communication apparatus for performing communication using a modem with a plurality of channels in one modulation/demodulation method, the plurality of channels using different respective frequencies, and the modem not being able to receive the plurality of channels at a same time, said communication apparatus comprising:

a frequency detector for detecting a frequency of a received signal; and a controller for specifying a channel of the modem, and for changing the channel of the modem in accordance with a detection result obtained by said frequency detector, wherein, when a frequency of a signal in a channel not being specified by said controller is detected by said frequency detector while the modem is operating in the specified channel, said controller changes the channel of the modem, so that said communication apparatus may perform communication in more than one communication channel, by distinguishing between the plurality of channels.

2. A communication apparatus according to claim 1, wherein said frequency detector is built into the modem.

3. A communication apparatus according to claim 1, wherein the modem includes a mode using only a V.21 (H) channel and a V.8 mode using both the V.21 (H) channel and a V.21 (L) channel in a T.30 protocol.

4. A communication apparatus according to claim 3, wherein said frequency detector detects a predetermined frequency of a signal in the V.21 (H) channel when the modem operates in the V.21 (L) channel.

5. A communication apparatus according to claim 3, wherein said frequency detector detects a predetermined frequency of a signal in the V.21 (L) channel when the modem operates in the V.21 (H) channel.

6. A communication apparatus according to claim 1, wherein, after said controller changes the channel of the modem in accordance with a detection of the frequency, said controller determines whether or not a signal is received in the changed channel by the modem, and, if the signal is properly received in the changed channel, said controller controls the modem to continue receiving the signal in the changed channel.

7. A communication apparatus according to claim 6, wherein, while said controller is determining whether or not the signal is properly received in the changed channel by the modem, a predetermined frequency of a signal in a previous channel is detected by said frequency detector, and detection of the predetermined frequency in the previous channel returns the channel of the modem to the previous channel.

8. A communication method for a communication apparatus that uses a modem with a plurality of channels in one modulation/demodulation method, the plurality of channels using different respective frequencies, and the modem not being able to receive the plurality of channels at a same time, said communication method comprising the steps of:

detecting a frequency of a received signal;

specifying a channel of the modem, and changing the channel in accordance with the detected frequency; and when a frequency of a signal in a channel not being specified is detected while the modem is operating in the specified channel, changing the channel of the modem, so that the communication apparatus may perform communication in more than one communication channel, by distinguishing between the plurality of channels.

9. A communication method according to claim 8, wherein detection of the frequency is performed by the modem.

10. A communication method according to claim 8, wherein the modem includes a mode using only a V.21 (H) channel and a V.8 mode using both the V.21 (H) channel and a V.21 (L) channel in a T.30 protocol.

11. A communication method according to claim 10, wherein said step of detecting the frequency detects a predetermined frequency of a signal in the V.21 (H) channel when the modem operates in the V.21 (L) channel.

12. A communication method according to claim 10, wherein said step of detecting the frequency detects a predetermined frequency of a signal in the V.21 (L) channel when the modem operates in the V.21 (H) channel.

13. A communication method according to claim 8, wherein, after the channel of the modem is changed in accordance with a detection of the frequency, a determination is made as to whether or not a signal is properly received in the changed channel by the modem, and, if the signal is properly received in the changed channel, the modem continues to receive the signal in the changed channel.

14. A communication method according to claim 13, wherein, while the determination is being made as to whether or not the signal is properly received in the changed channel by the modem, a predetermined frequency of a signal in a previous channel is detected and causes the channel of the modem to return to the previous channel.

* * * * *

UNITED STATES PATENT AND TRADEMARK OFFICE
CERTIFICATE OF CORRECTION

PATENT NO. : 6,292,509 B1
DATED : September 18, 2001
INVENTOR(S) : Toru Fujino

It is certified that error appears in the above-identified patent and that said Letters Patent is hereby corrected as shown below:

Column 2,
Line 63, "being not" should read -- not being --.

Column 3,
Line 13, "being not" should read -- not being --.

Column 4,
Line 47, "call" should read -- calling --.

Column 6,
Line 63, daring" should read -- during --.

Column 8,
Line 32, "by_the" should read -- by the --.

Signed and Sealed this

Second Day of April, 2002

Attest:

JAMES E. ROGAN
*Attesting Officer*     *Director of the United States Patent and Trademark Office*